G. J. BLUM.
SHAFT COUPLING.
APPLICATION FILED JULY 3, 1912.

1,093,822.

Patented Apr. 21, 1914.

Witnesses:
J. C. Devick
George L. Chiirdahl

Inventor:
George J. Blum.
By Luther L. Miller
Atty.

UNITED STATES PATENT OFFICE.

GEORGE J. BLUM, OF CHICAGO, ILLINOIS, ASSIGNOR TO ARMSTRONG-BLUM MANUFACTURING COMPANY, OF CHICAGO, ILLINOIS, A CORPORATION OF ILLINOIS.

SHAFT-COUPLING.

1,093,822.           Specification of Letters Patent.     Patented Apr. 21, 1914.

Application filed July 3, 1912. Serial No. 707,417.

*To all whom it may concern:*

Be it known that I, GEORGE J. BLUM, a citizen of the United States, residing at Chicago, in the county of Cook and State of Illinois, have invented certain new and useful Improvements in Shaft-Couplings, of which the following is a specification.

This invention relates to improvements in shaft couplings, and is shown applied to a universal joint, and has for its object to provide improved means for connecting a shaft to any adjacent part so that it may be readily disconnected when desired, and so as to prevent any twisting tendency of the coupling members relative to each other.

Figure 1:
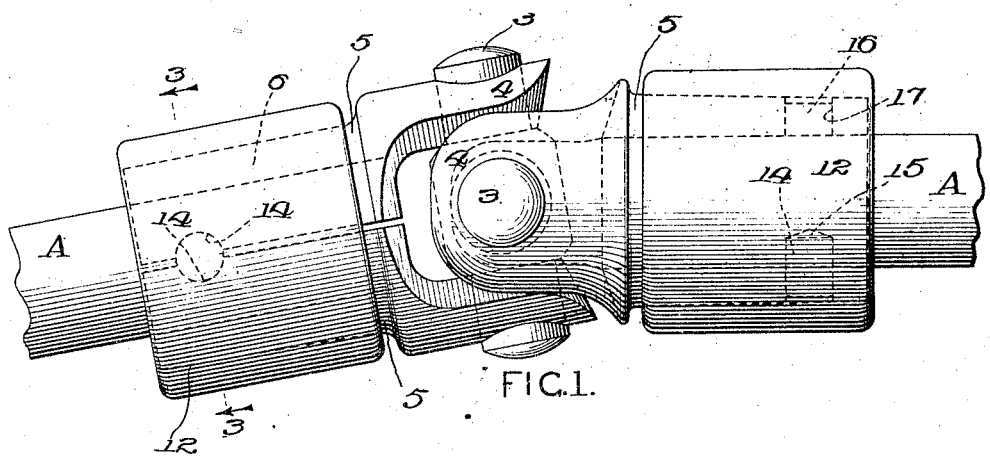
Figure 3:
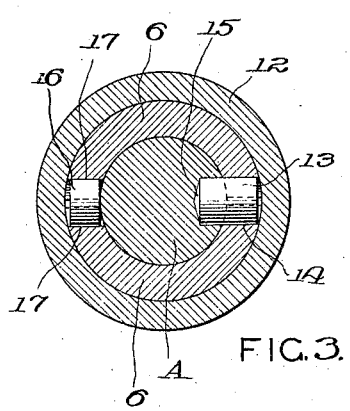
Figure 2:
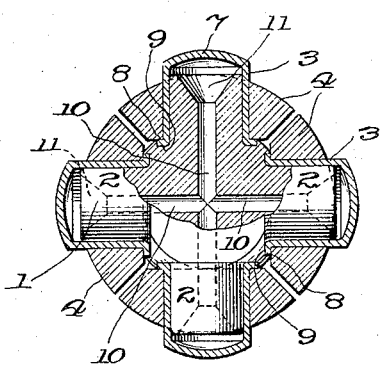
Figure 4:
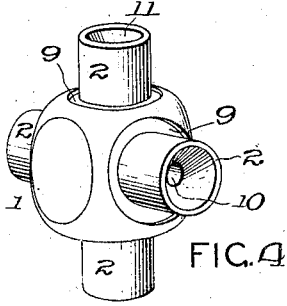

In the accompanying drawings, Figure 1 is a side view of a device which embodies the features of my invention. Fig. 2 is a transverse central section of the same. Fig. 3 is a section on the line 3 3 of Fig. 1; and Fig. 4 is a perspective view of a cross link used in the joint.

The cross link 1 of the joint has its journals 2 supported in bushing bearings 3. These bearings are firmly fixed in the arms 4 of the yoke links. The ordinary integral yoke or U-links of universal joints are replaced in this invention by split links, each composed of two members 5, each of the members having an offset or yoke arm 4 and a coupling shank 6. The arms 4 are adapted to support the bushing bearings 3, and the shanks 6 of each pair are adapted to inclose the shaft to be connected to the universal joint.

The bearings 3 may be formed in any suitable manner. Herein I have shown them formed out of sheet metal which may be drawn or spun into proper shape. The outer ends 7 of the bearings are imperforate so as to inclose the end of the journals and thus prevent dust and the like from working into the bearing and prevent grease or oil from escaping outwardly. The inner ends of the bearings are provided with annular flanges 8. These flanges are adapted to fit in annular grooves 9 formed in the hub of the cross link adjacent to the inner end of the journals thereof, thus preventing escape of the oil from the inner ends of the bearings. These flanges fitted in the grooves also prevent dust and other foreign substances working into the bearings. They also prevent outward movement of the bearings, and strengthen the joint.

The cross link is provided with passageways 10 extending longitudinally through the journals and the hub of the link, the passageways each having conical outer ends 11. When the joint is assembled these passageways are filled with oil or grease and as the joint rotates the grease works outwardly into the bearings and maintains proper lubricating films on the surfaces of the journals and bearings.

The inner surfaces of the shanks 6 of the yoke links conform to the surfaces of the shafts A to which the joint is to be coupled. When assembled these shanks 6 inclose the shaft, and they are held firmly in place by means of sleeves 12. The outer surfaces of the shanks when in place taper slightly away from the joint and the inner surface of the sleeve tapers similarly, so that a wedging action results when the sleeve is forced or driven onto the shanks, and the shaft is thus firmly clamped between them. To prevent rotation of the shaft in the members 6 a key 13 is provided. The key passes through recesses 14 formed in the adjacent edges of the shanks 6 and into depressions 15 in the shaft. In order to insure the shanks pressing closely against the shaft, and also to make allowance for slight variations in the size of the shafts, the edges of the shanks do not come in contact. Hence, to prevent a twisting tendency of the yoke members relative to each other when the key, as the shaft rotates, presses on one member and not on the other, a pin 16 is placed in recesses 17 in the edges of the members, diametrically opposite the key 13. And thus the members are at all times held from relative movement.

It will be readily seen that by driving the sleeves 12 off from the members on both sides of the joint the joint may be disconnected from both shafts and may be at once separated into its various parts. So that changes may be quickly and conveniently made. The joint may be again quickly assembled and coupled to the shafts.

I claim as my invention:

A shaft coupling comprising two semi-cylindrical portions forming between them an opening to receive a shaft; a sleeve fitting tightly around said semicylindrical portions and causing them to clamp the shaft; adjacent edges of said semicylindrical portions being recessed at diametrically opposite points; a pin extending transversely with relation to said members and the shaft, and lying in certain of said recesses and extending into the shaft; and a pin lying in the other recesses and opposite the first mentioned pin, said sleeve holding said pins against longitudinal movement.

In testimony whereof I affix my signature in the presence of two witnesses.

GEORGE J. BLUM.

Witnesses:
  EARL C. CARLSON,
  GEORGE L. CHINDAHL.